US009646563B2

United States Patent
Holland et al.

(10) Patent No.: US 9,646,563 B2
(45) Date of Patent: May 9, 2017

(54) MANAGING BACK PRESSURE DURING COMPRESSED FRAME WRITEBACK FOR IDLE SCREENS

(71) Applicant: Apple Inc., Cupertino, CA (US)

(72) Inventors: Peter F. Holland, Los Gatos, CA (US); Hari Ganesh R. Thirunageswaram, Milpitas, CA (US); Eric Young, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/676,565

(22) Filed: Apr. 1, 2015

(65) Prior Publication Data

US 2016/0292814 A1    Oct. 6, 2016

(51) Int. Cl.
| H04N 19/172 | (2014.01) |
| H04N 19/136 | (2014.01) |
| G09G 5/00 | (2006.01) |
| H04N 21/44 | (2011.01) |
| G09G 5/393 | (2006.01) |
| G09G 5/395 | (2006.01) |

(52) U.S. Cl.
CPC .............. *G09G 5/00* (2013.01); *G09G 5/393* (2013.01); *G09G 5/395* (2013.01); *H04N 19/136* (2014.11); *H04N 19/172* (2014.11); *H04N 21/44008* (2013.01); *G09G 2330/022* (2013.01); *G09G 2340/02* (2013.01); *G09G 2340/10* (2013.01); *G09G 2350/00* (2013.01)

(58) Field of Classification Search
None
See application file for complete search history.

(56) References Cited

U.S. PATENT DOCUMENTS

| 5,253,078 A | 10/1993 | Balkanski et al. |
| 5,636,294 A * | 6/1997 | Grosse .................... G06T 9/005 358/426.05 |
| 5,760,784 A * | 6/1998 | Bullis ....................... G06T 9/00 345/660 |
| 5,835,082 A * | 11/1998 | Perego ...................... G06T 9/00 345/542 |
| 6,044,419 A * | 3/2000 | Hayek ....................... G06F 5/06 345/531 |
| 8,087,029 B1 * | 12/2011 | Lindholm ............. G06F 9/5083 714/1 |
| 2005/0123041 A1 * | 6/2005 | Kake ...................... H04N 5/783 375/240.12 |
| 2012/0206461 A1 * | 8/2012 | Wyatt .................... G09G 5/003 345/501 |

(Continued)

*Primary Examiner* — Joni Richer
(74) *Attorney, Agent, or Firm* — Rory D. Rankin; Meyertons, Hood, Kivlin, Kowert & Goetzel, P.C.

(57) ABSTRACT

A display pipe is configured to generate output frames for display. Additionally, the display pipe may be configured to compress an output frame and write the compressed frame back to memory responsive to detecting static content in successive output frames. The display pipe may also be configured to determine to selectively allow write-back logic to operate when doing so will not cause a pixel underrun to the display. If an underrun might occur, write-back logic is temporarily disabled. If write-back is successful, the display pipe may read the compressed frame from memory for display instead of reading the source frames for compositing and display.

17 Claims, 10 Drawing Sheets

(56) References Cited

U.S. PATENT DOCUMENTS

| | | |
|---|---|---|
| 2012/0207208 A1 | 8/2012 | Wyatt et al. |
| 2013/0235941 A1* | 9/2013 | Koo .................. G09G 5/006 375/240.26 |
| 2013/0314429 A1 | 11/2013 | Croxford et al. |
| 2014/0292787 A1 | 10/2014 | Tripathi et al. |

* cited by examiner

MANAGING BACK PRESSURE DURING COMPRESSED FRAME WRITEBACK FOR IDLE SCREENS

BACKGROUND

Technical Field

Embodiments described herein relate to the field of digital systems and, more particularly, to low power mechanisms for managing displays in digital systems.

Description of the Related Art

Digital systems of various types often include, or are connected to, a display for the user to interact with the device. The display can be incorporated into the device. Examples of incorporated displays include the touchscreen on various smart phones, tablet computers, or other personal digital assistants. Another example of the incorporated display is a laptop with the screen in the lid. The display can also be connected to the device via a cable. Examples of the connected display include various desktop computers and workstations having a separate display that resides on the desk in front of the user. Some desktops also have an incorporated display (e.g., various iMac® computers from Apple Inc.). The display provides a visual interface that the user can view to interact with the system and applications executing on the system. In some cases (e.g., touchscreens), the display also provides a user interface to input to the system. Other user input devices (e.g., keyboards, mice or other pointing devices, etc.) can also be used.

In many cases, the images being displayed over a period of time are essentially static. For example, if the user is reading an ebook on the display, the display may be statically displaying a page of text until the user is finished reading the page. When a movie is paused, there may be no change in the images for the time that the pause is in effect. When a user is browsing web pages, again the user may be absorbing content and the images may be static. When there is little or no change in the static images being displayed, the memory bandwidth consumed to fetch the image each refresh cycle of the screen may be wasteful in terms of both bandwidth consumed and in power consumed.

SUMMARY

In one embodiment, a display pipe may be configured to generate one or more frames of images and/or video sequences to generate output frames for display. Additionally, the display pipe may be configured to compress output frames and write the compressed frames to memory. In various embodiments, compression and write back of frames is performed in response to detecting a series of successive frames with static content (e.g., an idle screen case) and responsive to detecting one or more conditions. The display pipe may also be configured to read compressed frames from memory for display instead of reading source frame data or other source data for generating images for display. As long as an idle frame condition persists, the display pipe may read the compressed output frame back from memory, decompress the compressed output frame, and then convey the decompressed output frame to a display device. Since the image is generally unchanging when the content is static, the compressed frame may be an acceptable representation of the image to be displayed. In other embodiments, the frame may not be compressed but may still be written back to memory. In such embodiments, the display pipe need not generate the frames again as long as the static content remains. Instead, the uncompressed frame may be read from memory and displayed.

In various embodiments, the display pipe may include at least pixel generation logic, compression logic, and write-back logic. When the idle frame condition is detected, the pixel generation logic may generate pixels of the output frame to drive to the display while the compression logic is compressing the output frame and the write-back logic is writing the compressed output frame back to memory. At times, the write-back logic may not be able to write back the compressed output frame to memory at the same rate that the pixel generation logic is generating pixels. For example, the write back logic may be configured to buffer a limited amount of received pixel data and may not be able to access the memory bus at a rate sufficient to convey compressed frames. When this occurs, back-pressure on the pixel generation logic may occur. Responsive to such back-pressure, the pixel generation unit may be forced to reduce the rate at which pixels are being generated. However, reducing the rate of pixel generation may cause an underrun to the display which may in turn cause undesirable visual artifacts.

Therefore, to avoid causing an underrun to the display that would cause undesirable visual artifacts, the display pipe may be configured to determine when to allow the write-back logic to operate. In various embodiments, the display pipe may include a pixel buffer configured to store pixels generated for display. In one embodiment, the display pipe may permit the write-back logic to compress and write-back data to memory if the amount of pixels currently stored in the pixel buffer is deemed adequate. In various embodiments, the amount of pixels in the pixel buffer is deemed adequate if there is at least a threshold amount of pixel data stored in the buffer. Such a threshold amount of pixel data may be an amount deemed able to withstand some degree of back pressure. When it is determined back pressure cannot be tolerated, the write-back logic may be temporarily disabled.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
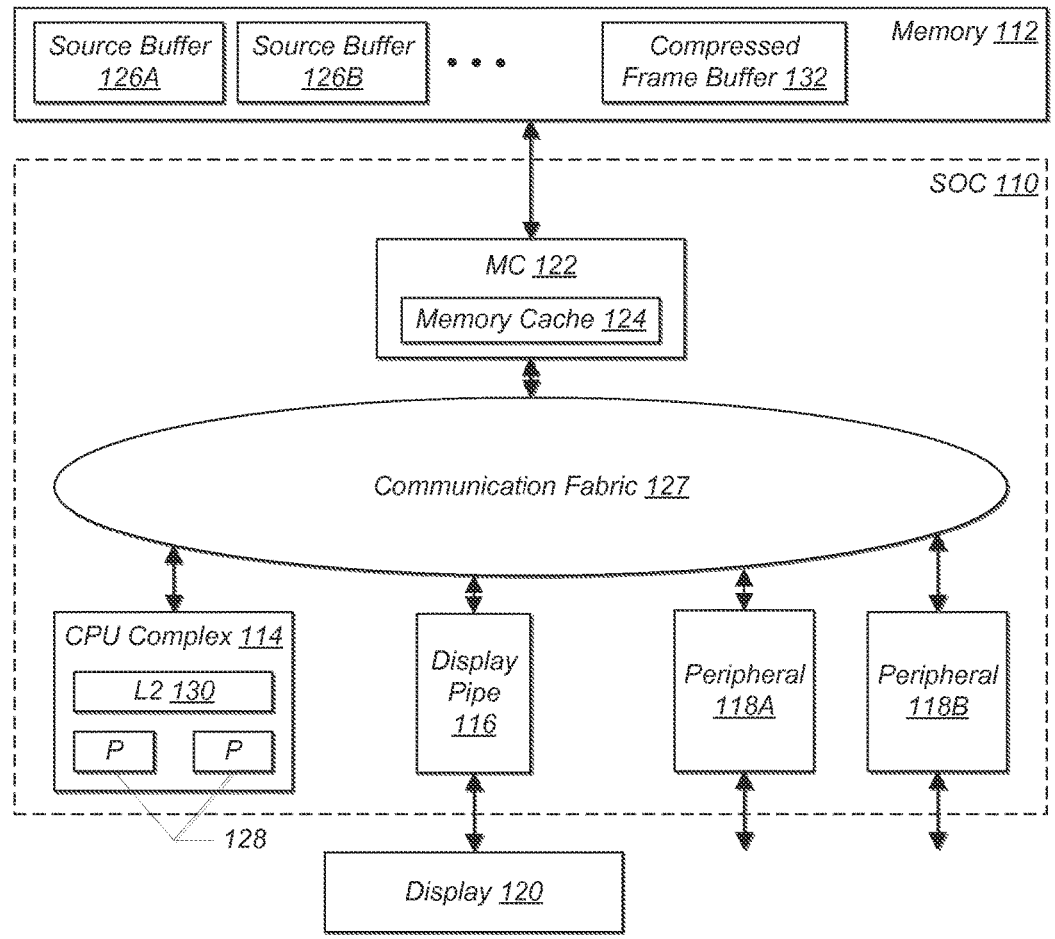
FIG. 1 is a block diagram of one embodiment of a system on a chip (SOC) coupled to a memory and a display.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

While the techniques described herein are susceptible to various modifications and alternative forms, specific embodiments thereof are shown by way of example in the drawings and will herein be described in detail. It should be understood, however, that the drawings and detailed description thereto are not intended to limit the techniques to the particular form disclosed, but on the contrary, the intention is to cover all modifications, equivalents and alternatives falling within the spirit and scope of the present embodiments as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a display control unit . . . ." Such a claim does not foreclose the system from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Turning now to FIG. 1, a block diagram of one embodiment of an SOC 110 is shown coupled to a memory 112 and one or more display devices 120. A display device may be more briefly referred to herein as a display. As implied by the name, the components of the SOC 110 may be integrated onto a single semiconductor substrate as an integrated circuit "chip." In some embodiments, the components may be implemented on two or more discrete chips in a system. However, the SOC 110 will be used as an example herein. In the illustrated embodiment, the components of the SOC 110 include a central processing unit (CPU) complex 114, a display pipe 116, peripheral components 118A-118B (more briefly, "peripherals"), a memory controller 122, and a communication fabric 127. The components 114, 116, 118A-118B, and 122 may all be coupled to the communication fabric 127. The memory controller 122 may be coupled to the memory 112 during use. Similarly, the display pipe 116 may be coupled to the display 120 during use. In the illustrated embodiment, the CPU complex 114 includes one or more processors 128 and a level two (L2) cache 130.

The display pipe 116 may include hardware to process one or more still images and/or one or more video sequences for display on the display 120. Generally, for each source still image or video sequence, the display pipe 116 may be configured to generate read memory operations to read the data representing the frame/video sequence from the memory 112 through the memory controller 122. The display pipe 116 may be configured to perform any type of processing on the image data (still images, video sequences, etc.). In one embodiment, the display pipe 116 may be configured to scale still images and to dither, scale, and/or perform color space conversion on the frames of a video sequence. The display pipe 116 may be configured to blend the still image frames and the video sequence frames to produce output frames for display. The display pipe 116 may also be more generally referred to as a display control unit. A display control unit may generally be any hardware configured to prepare a frame for display from one or more sources, such as still images and/or video sequences.

More particularly, the display pipe 116 may be configured to read from one or more source buffers 126A-126B located in the memory 112, generate frames from the source buffers, and display the resulting frames on the display 120. Accordingly, the frames displayed on the display 120 may not be directly retained during normal, dynamic operation. However, if static content is detected for a set of successive frames, the display pipe 116 may be configured to compress the resulting frame and write the compressed frame to a compressed frame buffer 132 in the memory 112. Alternatively, compressed frame buffer 132, or a portion thereof, may also be stored in memory cache 124 in some embodiments. In either case, the static content may be available for read and display, and the power consumed to read the multiple source buffers 126A-126B and composite the image data to generate the output frame may be avoided. In another embodiment, the resulting frame may be written back to memory 112 without compression. The frame may then be read and displayed.

During "normal" operation, when the idle screen is not detected, the display pipe 116 may be configured to fetch image data from source buffers 126A-126B in the memory 112 and generate output frames. In an embodiment, display pipe 116 may be configured to composite image data from multiple source buffers to generate an output frame. Compositing may include any processing by which image data from one or more images (e.g. frames from each video sequence and/or still image) are manipulated and/or combined to produce a new image. Compositing may include blending, scaling, rotating, color space conversion, etc. In general, pixels from two or more source buffers may overlap in the output frame, and display pipe 116 may be configured to operate on the pixels to produce a corresponding output pixel of the output frame.

If the source buffers 126A-126B contain full frames, the amount of data read may be reduced by a factor equal to the number of source buffers 126A-126B multiplied by the compression ratio achieved in the compressed frame compared to the full size frame. In some embodiments in which memory cache 124 is included within memory controller 122, the compressed frame may be more likely to fit in the memory cache 124 than the source buffers 126A-126B, reducing access to the memory 112 and thus power consumed in the accesses as well. A large percentage of the compressed frame may be stored in the memory cache 124 in cases in which the compressed frame does not fit entirely in the memory cache 124.

In one embodiment, the display pipe 116 may include circuitry configured to monitor for frames with static content (i.e., idle screen on case). More particularly, the display pipe 116 may identify multiple successive frames with static content. In another embodiment, software executing on processors 128 may identify multiple successive frames with static content and provide a corresponding indication to display pipe 116. Generally, static content may refer to content that is not changing from frame to frame (e.g., each pixel is the same from frame to frame) or to content that is changing by less than a threshold amount, so that displaying the compressed frame from the compressed frame buffer 132 is a close approximation to the current frame. The idle screen on case may be the case in which the user is viewing displayed data which is unchanging, such as an ebook, a web page or an email. Or, the user may have paused a video.

The display 120 may be any sort of visual display devices. The display may include, for example, touch screen style displays for mobile devices such as smart phones, tablets, etc. Display 120 may include liquid crystal display (LCD), light emitting diode (LED), plasma, cathode ray tube (CRT), etc. The display 120 may be integrated into a system including the SOC 110 (e.g. a smart phone or tablet) and/or may be a separately housed device such as a computer monitor, television, or other device. The display 120 may also include one or more displays coupled to the SOC 110 over a network (wired or wireless).

In some embodiments, the display 120 may be directly connected to the SOC 110 and may be controlled by the display pipe 116. That is, the display pipe 116 may include hardware (a "backend") that may provide various control/data signals to the display, including timing signals such as one or more clocks and/or the vertical blanking interval and horizontal blanking interval controls. The clocks may include the pixel clock indicating that a pixel is being transmitted. The data signals may include color signals such as red, green, and blue, for example. The display pipe 116 may control the display 120 in real-time, providing the data indicating the pixels to be displayed as the display is displaying the image indicated by the frame. The interface to such a display 120 may be, for example, VGA, HDMI, digital video interface (DVI), a liquid crystal display (LCD) interface, a plasma interface, a cathode ray tube (CRT) interface, any proprietary display interface, etc.

The CPU complex 114 may include one or more CPU processors 128 that serve as the CPU of the SOC 110. The CPU of the system includes the processor(s) that execute the main control software of the system, such as an operating system. Generally, software executed by the CPU during use may control the other components of the system to realize the desired functionality of the system. The CPU processors 128 may also execute other software, such as application programs. The application programs may provide user functionality, and may rely on the operating system for lower level device control. Accordingly, the CPU processors 128 may also be referred to as application processors. The CPU complex may further include other hardware such as the L2 cache 130 and/or and interface to the other components of the system (e.g., an interface to the communication fabric 127).

The peripherals 118A-118B may be any set of additional hardware functionality included in the SOC 110. For example, the peripherals 118A-118B may include video peripherals such as video encoder/decoders, image signal processors for image sensor data such as camera, scalers, rotators, blenders, graphics processing units, etc. The peripherals may include audio peripherals such as microphones, speakers, interfaces to microphones and speakers, audio processors, digital signal processors, mixers, etc. The peripherals may include interface controllers for various interfaces external to the SOC 110 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 122 may generally include the circuitry for receiving memory operations from the other components of the SOC 110 and for accessing the memory 112 to complete the memory operations. The memory controller 122 may be configured to access any type of memory 112. For example, the memory 112 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 122 may include various queues for buffering memory operations, data for the operations, etc., and the circuitry to sequence the operations and access the memory 112 according to the interface defined for the memory 112.

In the illustrated embodiment, the memory controller 122 may include a memory cache 124. The memory cache 124 (more briefly, mem cache or MCache) may store data that has been read from and/or written to the memory 112. The memory controller 122 may check the memory cache 124 prior to initiating access to the memory 112. Power consumption on the memory interface to the memory 112 may be reduced to the extent that mem cache hits are detected (or to the extent that mem cache allocates are performed for write operations). Additionally, latency for accesses that are mem cache hits may be reduced as compared to accesses to the memory 112, in some embodiments.

The communication fabric 127 may be any communication interconnect and protocol for communicating among the components of the SOC 110. The communication fabric 127 may be bus-based, including shared bus configurations, cross bar configurations, and hierarchical buses with bridges. The communication fabric 127 may also be packet-based, and may be hierarchical with bridges, cross bar, point-to-point, or other interconnects.

It is noted that the number of components of the SOC 110 (and the number of subcomponents for those shown in FIG. 1, such as within the CPU complex 114) may vary from embodiment to embodiment. There may be more or fewer of each component/subcomponent than the number shown in FIG. 1.

Figure 2:
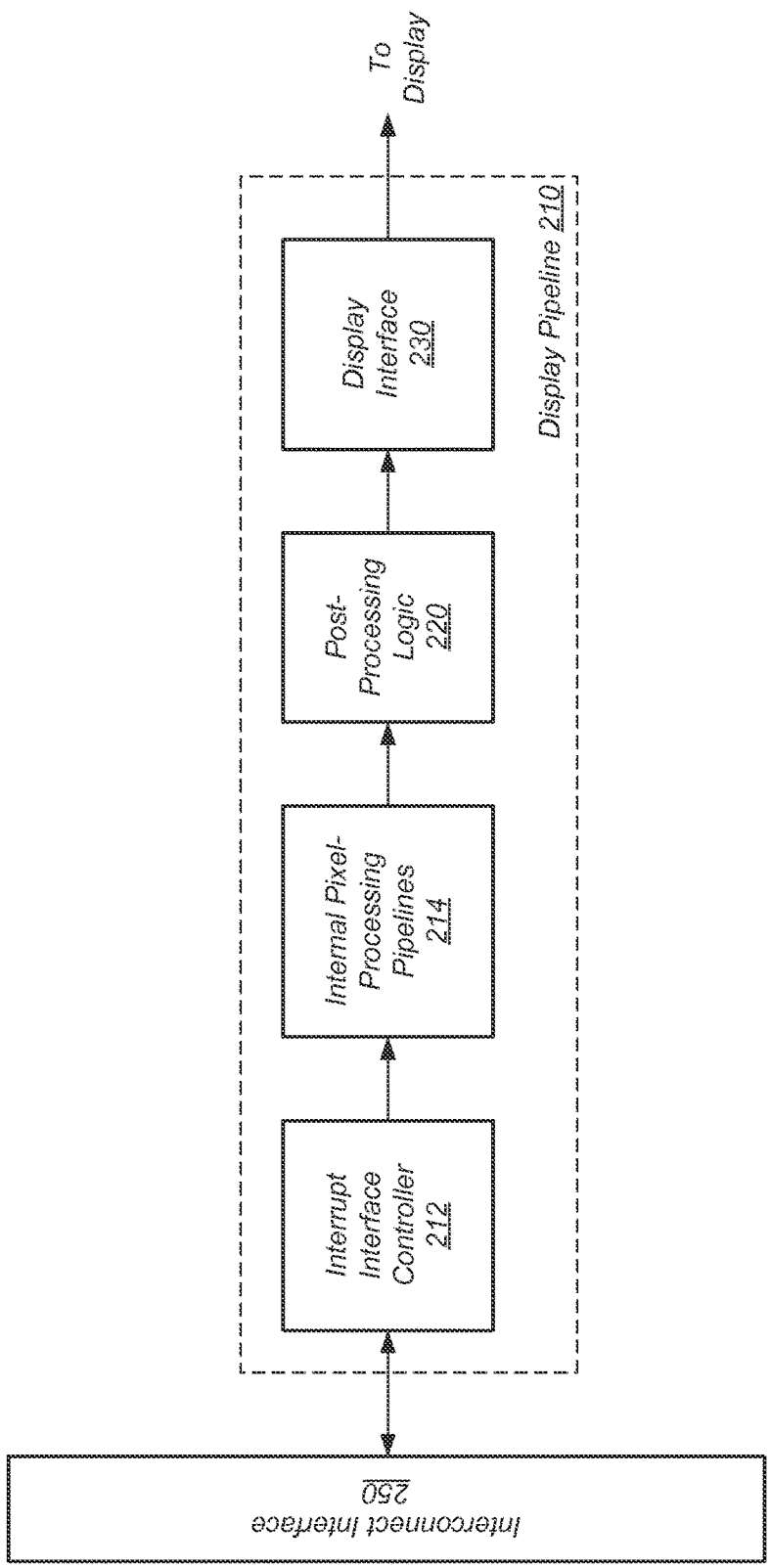
FIG. 2 is a block diagram of one embodiment of a display pipeline for use in a SoC.

Turning now to FIG. 2, a generalized block diagram of one embodiment of a display pipeline for use in a SoC is shown. Although one display pipeline is shown, in other embodiments, the host SOC (e.g., SOC 110) may include multiple display pipelines. Generally speaking, display pipeline 210 may be configured to process a source image and send rendered graphical information to a display (not shown).

Display pipeline 210 may be coupled to interconnect interface 250 which may include multiplexers and control logic for routing signals and packets between the display pipeline 210 and a top-level fabric. The interconnect interface 250 may correspond to communication fabric 127 of FIG. 1. Display pipeline 210 may include interrupt interface controller 212. Interrupt interface controller 212 may include logic to expand a number of sources or external devices to generate interrupts to be presented to the internal pixel-processing pipelines 214. The controller 212 may provide encoding schemes, registers for storing interrupt vector addresses, and control logic for checking, enabling, and acknowledging interrupts. The number of interrupts and a selected protocol may be configurable.

Display pipeline 210 may include one or more internal pixel-processing pipelines 214. The internal pixel-processing pipelines 214 may include one or more ARGB (Alpha, Red, Green, Blue) pipelines for processing and displaying user interface (UI) layers. The internal pixel-processing pipelines 214 may also include one or more pipelines for processing and displaying video content such as YUV content. In some embodiments, internal pixel-processing pipelines 214 may include blending circuitry for blending graphical information before sending the information as output to post-processing logic 220.

A layer may refer to a presentation layer. A presentation layer may consist of multiple software components used to define one or more images to present to a user. The UI layer may include components for at least managing visual layouts and styles and organizing browses, searches, and displayed data. The presentation layer may interact with process components for orchestrating user interactions and also with the business or application layer and the data access layer to form an overall solution. The YUV content is a type of video signal that consists of one signal for luminance or brightness and two other signals for chrominance or colors. The YUV content may replace the traditional composite video signal. For example, the MPEG-2 encoding system in the DVD format uses YUV content. The internal pixel-processing pipelines 214 may handle the rendering of the YUV content.

Internal pixel-processing pipelines 214 may also include compression and write-back logic for compressing an output frame and then writing the compressed output frame back to memory when an idle frame condition is detected. Internal pixel-processing pipelines 214 may also include decompression logic for decompressing the compressed output frame and then conveying the result to post-processing logic 220 for as long as the idle frame condition persists.

The post-processing logic 220 may be used for color management, ambient-adaptive pixel (AAP) modification, dynamic backlight control (DPB), panel gamma correction, and dither. The display interface 230 may handle the protocol for communicating with the display. For example, in one embodiment, a DisplayPort interface may be used. Alternatively, the Mobile Industry Processor Interface (MIPI) Display Serial Interface (DSI) specification or a 4-lane Embedded Display Port (eDP) specification may be used. It is noted that the post-processing logic and display interface may be referred to as the display backend.

Figure 3:
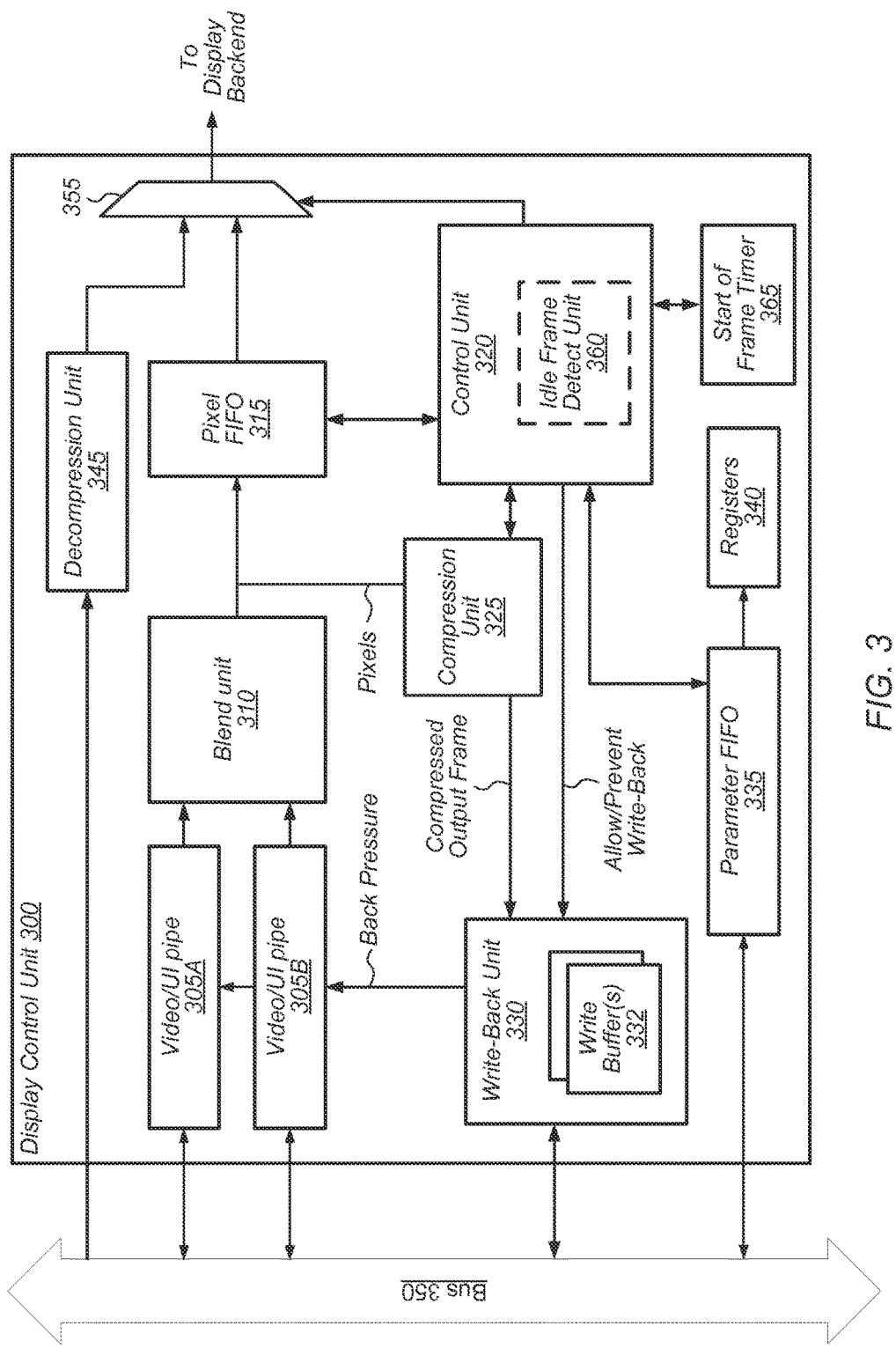
FIG. 3 is a block diagram of one embodiment of a display control unit.

Referring now to FIG. 3, one embodiment of a display control unit 300 is shown. Display control unit 300 may represent display pipe 116 included in SoC 110 of FIG. 1. Display control unit 300 may be coupled to a system bus 350 and to a display backend (not shown). In some embodiments, a display backend may directly interface to the display to display pixels generated by display control unit 300. Display control unit 300 may include functional sub-blocks such as one or more video/user interface (UI) pipelines 305A-B, blend unit 310, pixel First-In, First-Out buffer (FIFO) 315, control unit 320, compression unit 325, write-back unit 330, parameter FIFO 335, registers 340, decompression unit 345, mux 355, and start of frame timer 365. Display control unit 300 may also include other components which are not shown in FIG. 3 to avoid cluttering the figure.

System bus 350, in some embodiments, may correspond to communication fabric 127 from FIG. 1. System bus 350 couples various functional blocks such that the functional blocks may pass data between one another. Display control unit 300 may be coupled to system bus 350 in order to receive video frame data for processing. The display control unit 300 may include one or more video/UI pipelines 305A-B, each of which may be a video and/or user interface (UI) pipeline depending on the embodiment. It is noted that the terms "video/UI pipeline", "pixel processing pipeline", and "pixel generation logic" may be used interchangeably herein. In other embodiments, display control unit 300 may have one or more dedicated video pipelines and/or one or more dedicated UI pipelines. Each video/UI pipeline 305 may fetch a video or image frame from a buffer coupled to system bus 350. The buffered video or image frame may reside in a system memory such as, for example, system memory 112 from FIG. 1. Each video/UI pipeline 305 may fetch a distinct image and may process the image in various ways, including, but not limited to, format conversion (e.g., YCbCr to ARGB), image scaling, and dithering. In some embodiments, each video/UI pipeline 305 may process one pixel at a time, in a specific order from the video frame, outputting a stream of pixel data, and maintaining the same order as pixel data passes through.

Blend unit 310 may receive a pixel stream from one or more video/UI pipelines 305. If only one pixel stream is received, blend unit 310 may simply pass the stream through to the next sub-block. However, if more than one pixel stream is received, blend unit 310 may blend the pixel colors together to create an image to be displayed. In various embodiments, blend unit 310 may be used to transition from one image to another or to display a notification window on top of an active application window. For example, a top layer video frame for a notification, such as, for a calendar reminder, may need to appear on top of an internet browser window. The calendar reminder may comprise some transparent or semi-transparent elements in which the browser window may be at least partially visible, which may require blend unit 310 to adjust the appearance of the browser window based on the color and transparency of the calendar reminder.

In some embodiments, the blended pixel stream may be converted to a different color space after gamut corrections have been applied. For example, the color space may be changed based on the intended target display. The output of blend unit 310 may be a single pixel stream composite of the one or more input pixel streams. The pixel stream output of blend unit 310 may be sent to pixel FIFO 315 and to compression unit 325. In other embodiments, the pixel stream may be sent to other target destinations. For example, the pixel stream may be sent to a network interface. It is noted that while a pixel FIFO 315 is described herein, other structures configured to store data are possible and are contemplated.

Blend unit 310 may be configured to convey pixels to both compression unit 325 and pixel FIFO 315 for the first frame after an idle frame condition has been detected. For subsequent frames while the idle frame condition still applies, assuming the write-back of the compressed output frame was successfully completed, blend unit 310 may be turned off, power-gated, clock-gated, or otherwise placed into a dormant state, and decompression unit 345 may drive the decompressed output frame to the display backend via mux 355.

Pixel FIFO 315 may be configured to store pixels output from blend unit 310. A FIFO as used and described herein, may refer to a memory storage buffer in which data stored in the buffer is read in the same order it was written. A FIFO may be comprised of RAM or registers and may utilize pointers to the first and last entries in the FIFO. During "normal" operation, pixel FIFO 315 may be the interface to the display backend (not shown), which may control the display to display the pixels generated by display control unit 300. In one embodiment, the display backend may read pixels at a regular rate from output FIFO 315 according to a pixel clock. The rate may depend on the resolution of the display as well as the refresh rate of the display. For example, a display having a resolution of NxM and a refresh rate of R frames per second may have a pixel clock frequency based on NxMxR. On the other hand, pixel FIFO 315 may be written by blend unit 310 as pixels are generated by blend unit 310. In some instances, the rate at which display control unit 300 generates pixels may be faster than the rate at which the pixels are read, assuming that data is provided to display control unit 300 from the memory (not shown) quickly enough. The pixels in pixel FIFO 315 may thus be a measure of a margin of safety for display control unit 300 before erroneous operation is observed on the display.

Control unit 320 may receive various control signals and include various control logic for managing the overall operation of display control unit 300. For example, control unit 320 may receive a signal to indicate a new video frame is ready for processing. In some embodiments, this signal may be generated outside of display control unit 300 and in other embodiments display control unit 300 may generate the signal. In some embodiments, display control unit 300 may include a parameter FIFO 335. The parameter FIFO 335 may store values to be written to the configuration registers 340 for subsequent frames. The same configuration of registers may be used for multiple frame generations, in some embodiments, and thus the parameter FIFO 335 may include data that indicates how many frames should be processed with a given configuration before a new configuration is used. The parameter FIFO 335 may further store register addresses of the configuration registers 340 and data to be written to those registers 340. The parameter FIFO 335 may thus be a mechanism to store a stream of frame processing in display control unit 300 and then permit display control unit 300 to perform the stream. Various other parameters that display control unit 300 uses to control how the various sub-blocks manipulate the video frame may also be stored in registers 340. Registers 340 may include data setting input and output frame sizes, setting input and output pixel formats, location of the source frames, and destination of the output.

In some embodiments, control unit 320 may designate a quality of service (QoS) state for each pixel fetch request and/or writeback request. The QoS states may be utilized to control the priority of requests that are sent to memory from display control unit 300. In one embodiment, there may be three QoS levels—green, yellow, and red corresponding to low, medium, and high levels of priority, respectively. The QoS information may be generated per request and/or may be communicated to the communication fabric and memory subsystem via sideband signaling.

When an idle frame condition has been detected, compression unit 325 may be configured to compress pixels as they are generated (e.g., by blend unit 310 in one embodiment). Any suitable type of compression (e.g., lossless, lossy) may be utilized depending on the embodiment. In one embodiment, display control unit 300 may include an idle frame detect unit 360 to detect the idle frame condition. The idle screen detect circuit 360 may be configured to detect whether or not the content of the current frame has changed from the previous frame. There may be a variety of mechanisms for detecting whether or not the content is changing. In another embodiment, software or another unit of the host SoC (e.g., SoC 110) may be configured to detect the idle frame condition and then send an indication to display control unit 300. Compression unit 325 may send the compressed pixel data to write-back unit 330 to be written back to memory (or another storage location) via bus 350. In some embodiments, the output frame may be written back to memory without being compressed. In these embodiments, compression unit 325 may be a pass-through unit or may be omitted from display control unit 300.

Compression unit 325 may convey compressed data to write-back unit 330 as pixels are simultaneously conveyed from blend unit to pixel FIFO 315. It is noted that write-back unit 330 may also be referred to as the "write-back logic". In some cases, compression unit 325 may convey compressed data to write-back unit 330 faster that write-back unit 330 can write the data back to memory. For example, the write buffers 332 of write-back unit 330 may fill up with pending write requests of the compressed output frame data, and write-back unit 330 may not have other storage space to store any additional data received from compression unit 325. In these cases, write-back unit 330 may attempt to back pressure video/UI pipes 305A-B to slow down or pause pixel generation so that write-back unit 330 can process the stored data in order to free up space for additional compressed data from compression unit 325. However, in certain scenarios, if write-back unit 330 applies back pressure to video/UI pipes 305A-B, the slowdown in pixel generation may cause an underrun to the display. Therefore, to avoid an underrun, control unit 320 may send an indication to write-back unit 330 on whether write-back is allowed or prevented. In various embodiments, preventing back pressure may mean temporarily disabling compression and write back. Control unit 320 may be configured to determine if there is an adequate pixel margin for allowing back pressure. In one embodiment, control unit 320 may determine whether to allow write-back based on the amount of pixels stored in pixel FIFO 315. In another embodiment, control unit 320 may determine whether to allow write-back based on additional factors such as the status of the memory system, the number and QoS status of outstanding memory transactions, status of other functional blocks in the host SoC, number of received but unprocessed pixels in video/UI pipes 305A-B, and/or one or more other metrics.

In one embodiment, control unit 320 may monitor start of frame timer 365 to determine when to start monitoring the conditions used for determining whether to allow write-back. Start of frame timer 365 may be configured to run during the start of the frame prior to pixels actually being driven to the display. In one embodiment, while the start of frame timer 365 is running and before it expires, control unit 320 may send an indication to write-back unit 330 that write-back is allowed.

It is noted that there may be cases when control unit 320 sends an indication to write-back unit 330 that write-back is allowed but write-back unit 330 does not actually back pressure video/UI pipes 305A-B. This may occur when write-back unit 330 is able to process and write the data of the compressed output frame back to memory at a rate greater than or equal to the rate at which data is received from compression unit 325.

Control unit 320 may be configured to select the output of pixel FIFO 315 through the mux 355 when the output frame content is changing. When an idle frame condition has been detected and after the compressed output frame has been successfully written back to memory, control unit 320 may select the output of decompression unit 345 through mux 355 to drive the display backend. Control unit 320 may also be configured to disable video/UI pipelines 305A-B, blend unit 310, and pixel FIFO 315 responsive to the compressed frame being successfully written back to memory. In embodiments that do not implement compression, the decompression may be skipped and the uncompressed frame may be provided through the mux 355.

It is noted that the display control unit 300 illustrated in FIG. 3 is merely an example. In other embodiments, different functional blocks and different configurations of functional blocks may be possible depending on the specific application for which the display control unit is intended. For example, more than two video/UI pipelines may be included within a display control unit in other embodiments. Additionally, two or more units shown separately within display control unit 300 may be combined within a single functional sub-block in another embodiment.

Figure 4:
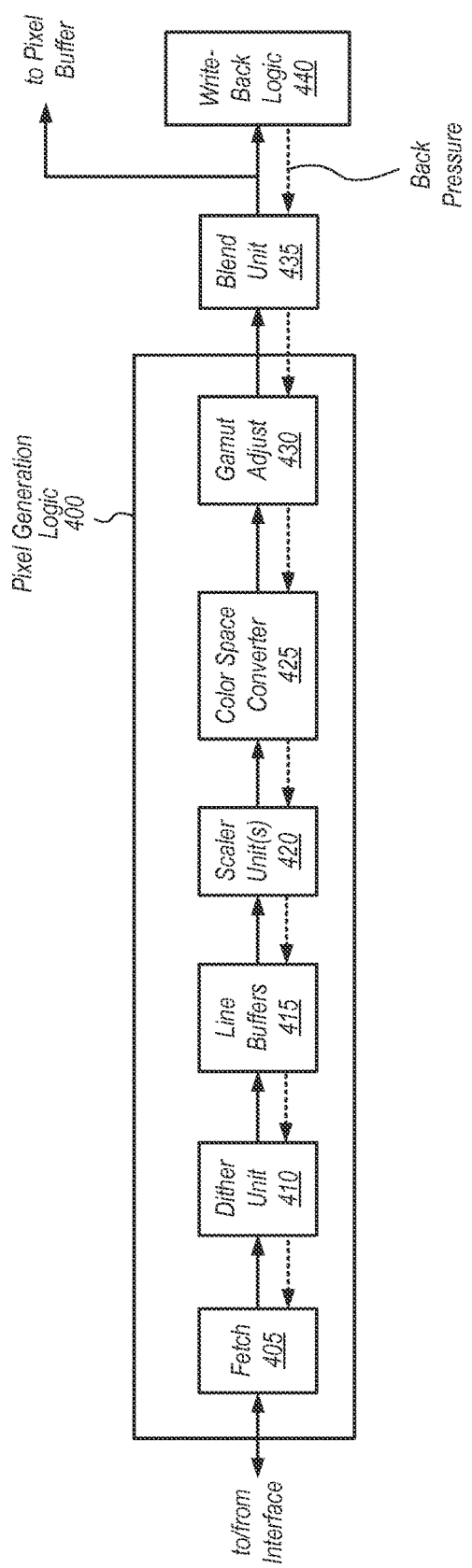
FIG. 4 is a block diagram of one embodiment of pixel generation logic.

Turning now to FIG. 4, a block diagram of one embodiment of pixel generation logic 400 is shown. Pixel generation logic 400 may correspond to video/UI pipelines 301A and 301B of display pipeline 300 as illustrated in FIG. 3. In the illustrated embodiment, pixel generation logic 400 includes fetch unit 405, dither unit 410, line buffers 415, scaler unit(s) 420, color space converter 425, and gamut adjust unit 430. Gamut adjust unit 430 may be coupled to blend unit 435 and write-back logic 440. When not in the idle screen on case, pixel generation logic 400 may be responsible for fetching pixel data for source frames stored in a memory, and then processing the fetched data before sending the processed data to a blend unit, such as, blend unit 302 of display control unit 300 as illustrated in FIG. 3.

The write-back logic 440 may be configured to generate back pressure to slow down or pause the operations being performed by blend unit 435 and/or the pixel generation logic 400. The back pressure generated on blend unit 435 by write-back logic 440 may be passed from blend unit 435 to gamut adjust unit 430, from gamut adjust unit 430 to color space converter 425, and so on. Depending on the embodiment, the back pressure may be applied to one or more portions of pixel generation logic 400. For example, in one embodiment, the back pressure may be applied by slowing down or stopping the generation of new fetch requests by fetch unit 405 for pixels of the source frame(s) stored in memory. In another embodiment, back pressure may be applied by clock-gating one or more portions of pixel generation logic 400 for a given number of clock cycles. In this embodiment, the number of clock cycles during which the portion(s) of the pixel generation logic are clock-gated may be proportional to the occupancy of the pixel FIFO. Accordingly, the higher the occupancy of the pixel FIFO, the longer the portion(s) of the pixel generation logic may be clock-gated. In a further embodiment, back pressure may be applied by reducing the frequency of the clock being applied to one or more portions of pixel generation logic 400 for a given number of clock cycles. Other techniques for applying back pressure to the pixel generation logic are possible and are contemplated.

The mechanism for implementing back pressure may also be used to power-gate or turn off the pixel generation logic 400 when the compressed output frame has been successfully written back to memory and is being fetched, decompressed, and displayed by the display pipeline during the idle screen on case.

Fetch unit 405 may be configured to generate read requests for source pixel data being processed by pixel generation logic 400. Each read request may include one or more addresses indicating where the portion of data is stored in memory. In some embodiments, address information included in the read requests may be directed towards a virtual (also referred to herein as "logical") address space, wherein addresses do not directly point to physical locations within a memory device. In such cases, the virtual addresses may be mapped to physical addresses before the read requests are sent to the source buffer. A memory management unit may, in some embodiments, be used to map the virtual addresses to physical addresses. In some embodiments, the memory management unit may be included within the display pipeline, while in other embodiments, the memory management unit may be located elsewhere within a computing system.

Under certain circumstances, the total number of colors that a given system is able to generate or manage within the given color space—in which graphics processing takes place—may be limited. In such cases, a technique called dithering is used to create the illusion of color depth in the images that have a limited color palette. In a dithered image, colors that are not available are approximated by a diffusion of colored pixels from within the available colors. Dithering in image and video processing is also used to prevent large-scale patterns, including stepwise rendering of smooth gradations in brightness or hue in the image/video frames, by intentionally applying a form of noise to randomize quantization error. Dither unit 410 may, in various embodiments, provide structured noise dithering on the Luma channel of YCbCr formatted data. Other channels, such as the chroma channels of YCbCr, and other formats, such as ARGB may not be dithered.

Line buffers 415 may be configured to store the incoming frame data corresponding to row lines of a respective display screen. The frame data may be indicative of luminance and chrominance of individual pixels included within the row lines. Line buffers 415 may be designed in accordance with one of various design styles. For example, line buffers 415 may be SRAM, DRAM, or any other suitable memory type. In some embodiments, line buffers 415 may include a single input/output port, while, in other embodiments, line buffers 415 may have multiple data input/output ports.

In some embodiments, scaling of source pixels may be performed in two steps. The first step may perform a vertical scaling, and the second step may perform a horizontal scaling. In the illustrated embodiment, scaler unit(s) 420 may perform the vertical and horizontal scaling. Scaler unit(s) 420 may be designed according to any of varying design styles. In some embodiments, the vertical scaler and horizontal scaler of scaler unit(s) 420 may be implemented as 9-tap 32-phase filters. These multi-phase filters may, in various embodiments, multiply each pixel retrieved by fetch unit 405 by a weighting factor. The resultant pixel values may then be added, and then rounded to form a scaled pixel. The selection of pixels to be used in the scaling process may be a function of a portion of a scale position value. In some embodiments, the weighting factors may be stored in a programmable table, and the selection of the weighting factors to use in the scaling may be a function of a different portion of the scale position value.

Color management within pixel generation logic 400 may be performed by color space converter 425 and gamut adjust unit 430. In some embodiments, color space converter 425 may be configured to convert YCbCr source data to the RGB format. Alternatively, color space converter may be configured to remove offsets from source data in the RGB format. Color space converter 425 may, in various embodiments, include a variety of functional blocks, such as an input offset unit, a matrix multiplier, and an output offset unit (all not shown). The use of such blocks may allow the conversion from YCbCr format to RGB format and vice-versa.

In various embodiments, gamut adjust unit 430 may be configured to convert pixels from a non-linear color space to a linear color space, and vice-versa. In some embodiments, gamut adjust unit 430 may include a Look Up Table (LUT) and an interpolation unit. The LUT may, in some embodiments, be programmable and be designed according to one of various design styles. For example, the LUT may include a SRAM or DRAM, or any other suitable memory circuit. In some embodiments, multiple LUTs may be employed. For example, separate LUTs may be used for Gamma and De-Gamma calculations. The output of gamut adjust unit 430 may be coupled to blend unit 435. Although not shown, one or more other pixel generation pipelines may also be coupled to blend unit 435. The output of blend unit 435 may be coupled to write-back logic 440 and the pixel buffer (not shown). It is noted that the embodiment illustrated in FIG. 4 is merely an example. In other embodiments, different functional blocks and different configurations of functional blocks may be utilized.

Figure 5:
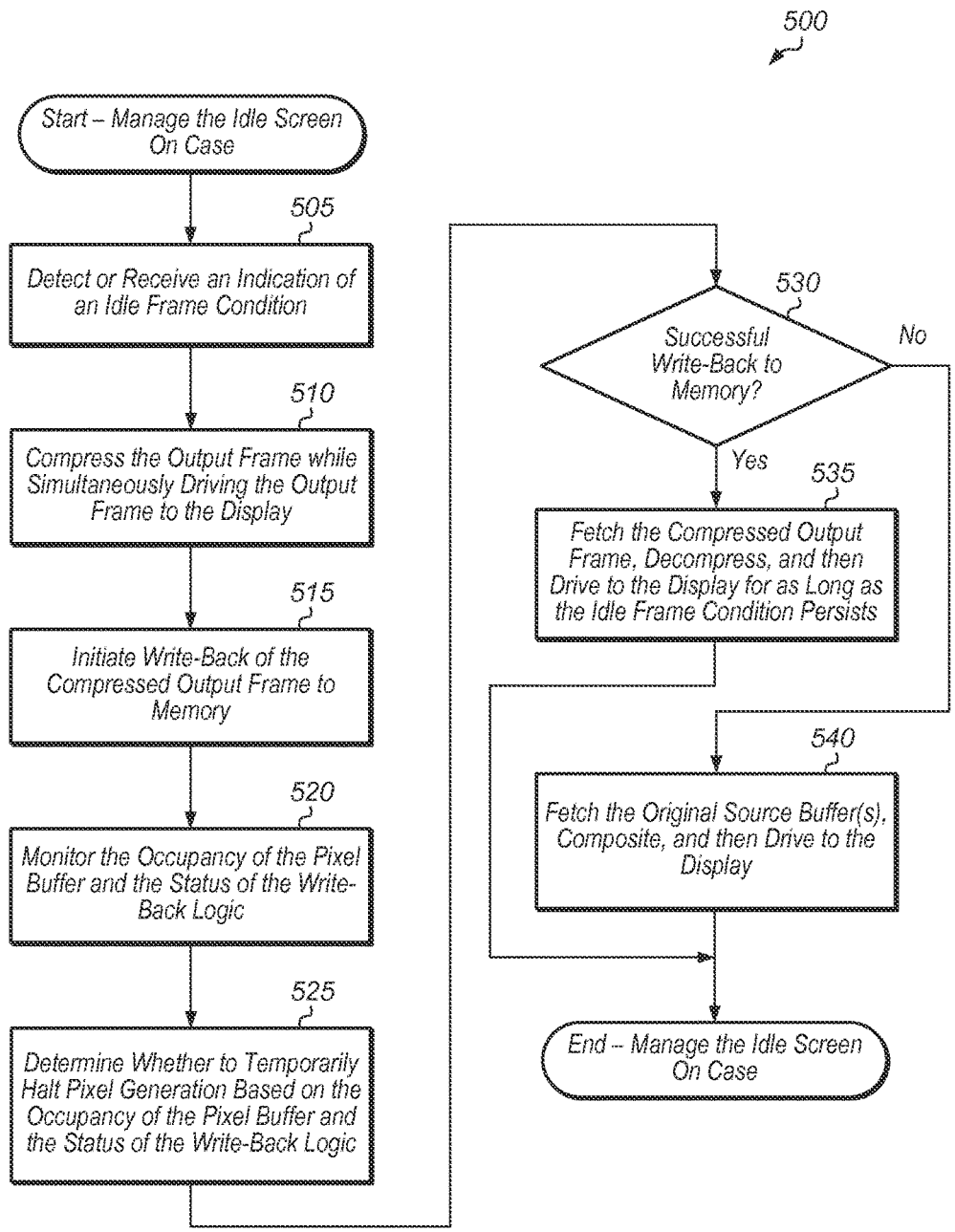
FIG. 5 is a generalized flow diagram illustrating one embodiment of a method for managing the idle screen on case.

Turning now to FIG. 5, one embodiment of a method 500 for managing the idle screen on case is shown. The components embodied in SoC 110 (of FIG. 1) described above (e.g., display pipe 116) or display control unit 300 of FIG. 3 may generally operate in accordance with method 500. In addition, the steps in this embodiment are shown in sequential order. However, some steps may occur in a different order than shown, some steps may be performed concurrently, some steps may be combined with other steps, and some steps may be absent in another embodiment.

The display pipeline may detect or receive an indication of an idle frame condition (block 505). In one embodiment, the display pipeline may detect the idle frame condition. In another embodiment, software executing on the host SoC or another unit may detect the idle frame condition and notify the display pipeline. In response to the idle frame condition, the display pipeline may be configured to compress the output frame while simultaneously driving the output frame to the display (block 510). Also, the display pipeline may be configured to initiate write-back of the compressed output frame to memory (block 515). The write-back of the compressed output frame to memory may also occur simultaneously to the output frame being driven to the display.

Additionally, the display pipeline may monitor the occupancy of the pixel buffer and the status of the write-back logic while writing the compressed output frame back to memory (block 520). Depending on the embodiment, monitoring the status of the pixel generation logic may include monitoring one or more metrics including the amount of pixel data in the pixel buffer, the number of outstanding memory transactions, the QoS status of outstanding memory transactions, the status of other functional blocks in the host SoC, the number of received but unprocessed pixels in the pixel generation logic, and/or one or more other metrics.

Based on the occupancy of the pixel buffer and the status of the write-back logic, the display pipeline may determine whether to temporarily halt pixel generation (block 525). Examples of determining whether to temporarily halt pixel generation, reduce the rate of pixel generation, and/or back-pressure the pixel generation pipeline based on the occupancy of the pixel buffer and on the status of the write-back logic are described in more detail in FIGS. 6 and 7. Next, the display pipeline may determine if the compressed output frame was successfully written back to memory (conditional block 530).

If the compressed output frame was successfully written back to memory (conditional block 530, "yes" leg), then the display pipeline may fetch and drive the compressed output frame to the display for as long as the current idle frame condition persists (block 535). If the compressed output frame was not successfully written back to memory (conditional block 530, "yes" leg), then the display pipeline may continue to fetch, composite, and drive the original source buffer(s) to the display (block 540). After blocks 535 and 540, method 500 may end.

Figure 6:
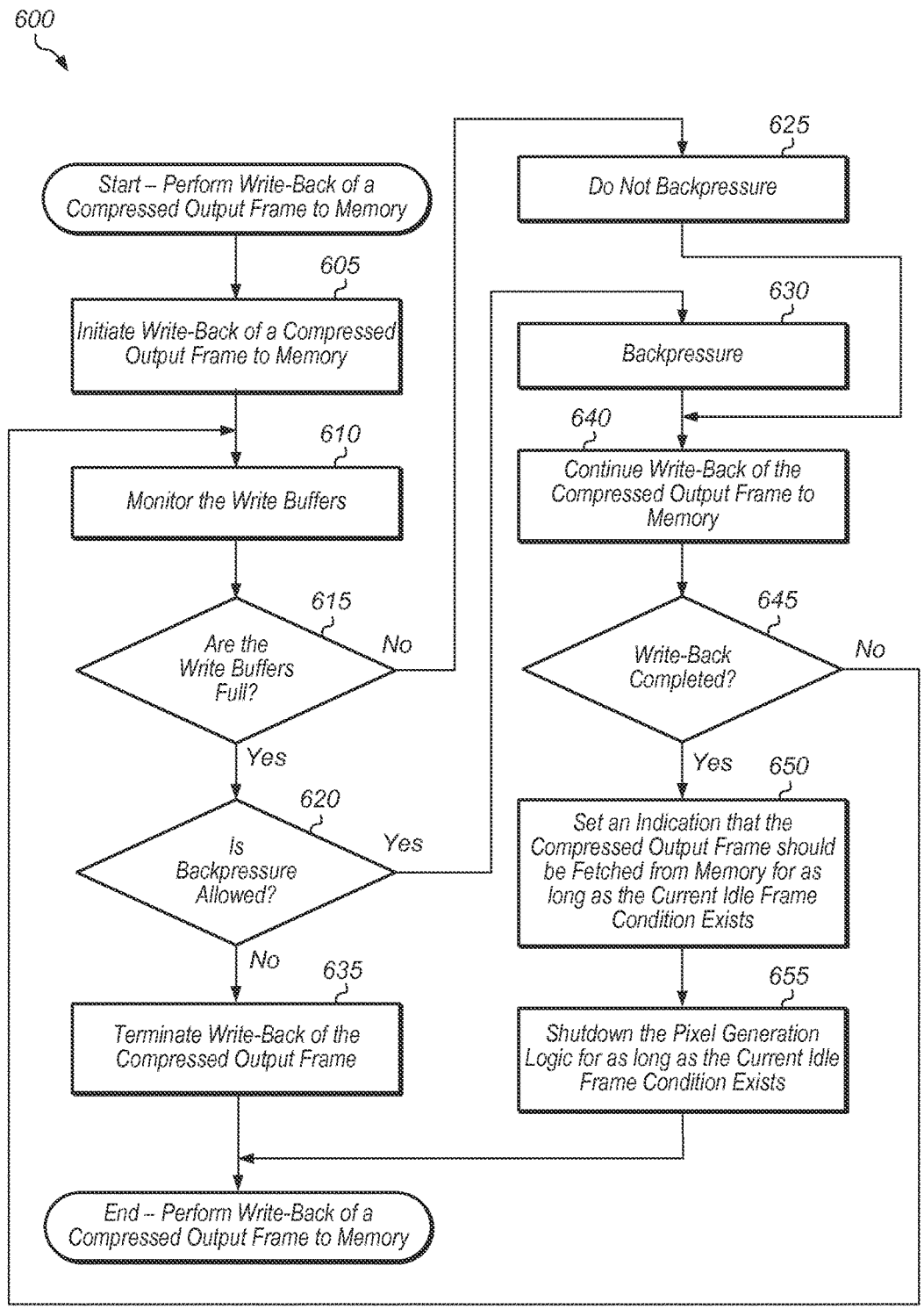
FIG. 6 is a generalized flow diagram illustrating one embodiment of a method for writing a compressed output frame back to memory.

Referring now to FIG. 6, one embodiment of a method 600 for writing a compressed output frame back to memory is shown. The components embodied in SoC 110 (of FIG. 1) described above (e.g., display pipe 116, display control unit 300) may generally operate in accordance with method 600. In addition, the steps in this embodiment are shown in sequential order. However, some steps may occur in a different order than shown, some steps may be performed concurrently, some steps may be combined with other steps, and some steps may be absent in another embodiment.

The display pipeline may initiate write-back of a compressed output frame to memory (block 605). It may be assumed for the purposes of this discussion that the idle frame condition has already been detected for the current output frame and that the current output frame is in the process of being (or has already been) compressed. While writing the compressed output frame back to memory, the display pipeline may monitor the write-back logic write buffers (block 610). If the write buffers are full (conditional block 615, "yes" leg), then the display pipeline may determine whether the write-back logic is allowed to backpressure the pixel generation logic (conditional block 620). If the write buffers are not full (conditional block 615, "no" leg), then the write-back logic may be configured to not generate backpressure (block 625). After block 625, display pipeline may continue write-back of the compressed output frame to memory (block 640).

If the write-back logic has permission to backpressure the pixel generation logic (conditional block 620, "yes" leg), then at least some degree of back-pressure may occur (block 630) and then the display pipeline may continue write-back of the compressed output frame to memory (block 640). In various embodiments, back-pressure may result in a reduced rate of pixel generation which allows the write-back logic time for buffered write requests in the write buffers to be processed. For example, write-back logic may convey a signal to pixel generation logic that causes a rate of pixel generation to be reduced. Alternatively, pixel generation logic or other logic monitors that state of buffers in the write-back logic and determines whether the rate of pixel generation should be reduced. Numerous such embodiments are possible and are contemplated. If the write-back logic does not currently have permission to backpressure the pixel generation logic (conditional block 620, "no" leg), then the display pipeline may terminate write-back of the compressed output frame to memory or cease write-back of frames after write back of the current frame completes (block 635). After block 635, method 600 may end.

After block 640, the display pipeline may determine if write-back of the compressed output frame to memory has been completed (conditional block 645). If write-back of the compressed output frame to memory has been completed (conditional block 645, "yes" leg), then the display pipeline may set an indication that the compressed output frame should be fetched from memory for as long as the current idle frame condition exists (block 650). Also, the display pipeline may shut down (or otherwise reduce operation of) the pixel generation logic for as long as the current idle frame condition exists (block 655). After block 655, method 600 may end. If write-back of the compressed output frame to memory has not completed (conditional block 645, "no" leg), then method 600 may return to block 610 with the display pipeline monitoring the write buffers of the write-back logic.

Figure 7:
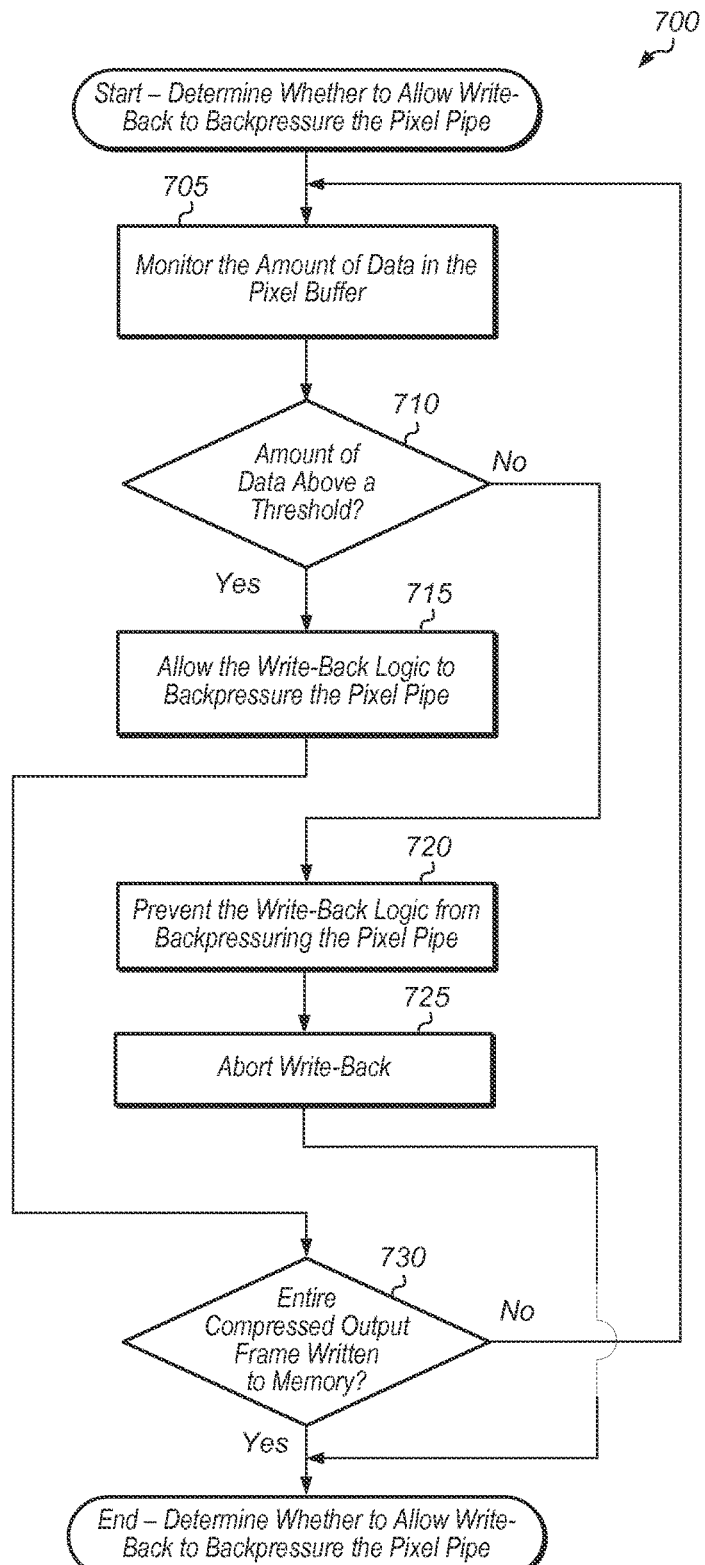
FIG. 7 is a generalized flow diagram illustrating one embodiment of a method for determining whether to allow write-back.

Referring now to FIG. 7, one embodiment of a method 700 for determining whether to allow write-back to backpressure the pixel pipe is shown. The components embodied in SoC 110 (of FIG. 1) described above (e.g., display pipe 116, display control unit 300) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

The display pipeline may monitor the amount of pixel data in the pixel buffer (block 705). If the amount of data in the pixel buffer is above a threshold (conditional block 710), then the display pipeline may allow the write-back logic to backpressure the pixel pipe (block 715). In various embodiments, the threshold is programmable. If the amount of pixels in the pixel buffer(s) is below the programmable threshold (conditional block 710), then the display pipeline may prevent the write-back logic from backpressuring the pixel pipe (block 720). Next, the display pipeline may abort write-back of the compressed output frame to memory (block 725).

After block 715, the display pipeline may determine if the entire compressed output frame has been written to memory (conditional block 730). If the entire compressed output frame has been written to memory (conditional block 730, "yes" leg), then method 700 may end. If the entire compressed output frame has not yet been written to memory (conditional block 730, "no" leg), then method 700 may return to block 705 with the display pipeline monitoring the amount of pixels in the pixel buffer.

Figure 8:
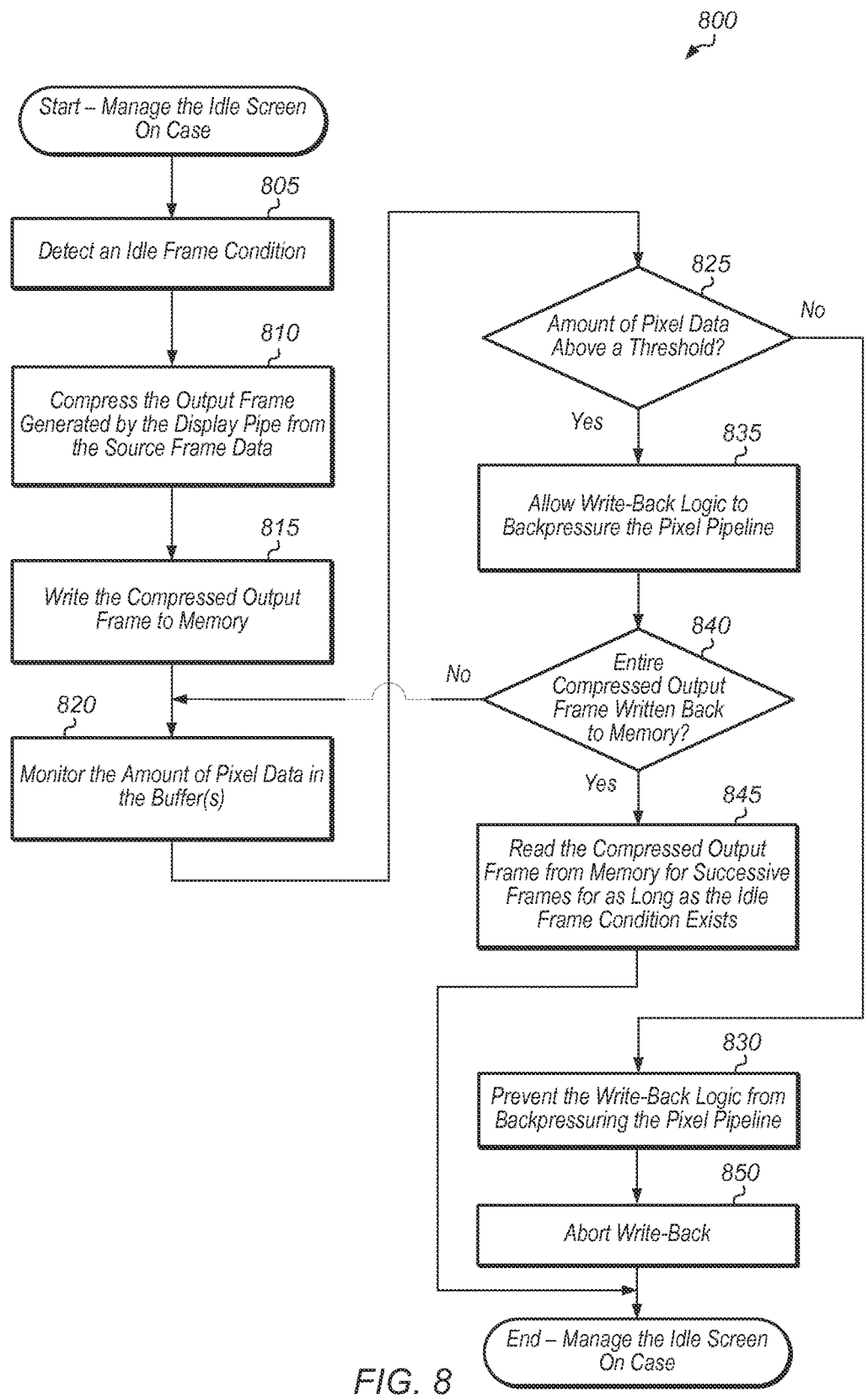
FIG. 8 is a generalized flow diagram illustrating another embodiment of a method for managing the idle screen on case.

Referring now to FIG. 8, another embodiment of a method 800 for managing the idle screen on case is shown. The components embodied in SoC 110 (of FIG. 1) described above (e.g., display pipe 116) and/or the components in display control unit 300 (of FIG. 3) may generally operate in accordance with method 800. In addition, the steps in this embodiment are shown in sequential order. However, some steps may occur in a different order than shown, some steps may be performed concurrently, some steps may be combined with other steps, and some steps may be absent in another embodiment. For example, some steps may be performed in parallel in combinatorial logic circuitry in the display control unit 300 (and components thereof). Blocks, combinations of blocks, and/or the flowchart as a whole may be pipelined over multiple clock cycles.

An idle frame condition may be detected (block 805). In one embodiment, a repeated frame may be detected by the display pipeline in a computing device (e.g., processor, system on a chip, or otherwise). In another embodiment, the repeated frame may be detected by software executing on a processor of the SoC. In other embodiments, other mechanisms for detected a repeated frame may be utilized. Subsequently, the display pipeline may start compression logic for compressing the output frame generated by the display pipeline from the source frame data (block 810). The display pipeline may start the compression logic for compressing the output frame while simultaneously driving the output frame to the display.

The display pipeline may also start the write-back logic for writing the compressed output frame back to memory, the memory cache, and/or another location (block 815). The display pipeline may also monitor the number of pixels in the pixel buffer (block 820). If the amount of pixel data is below a threshold (conditional block 825), then the display pipeline may prevent the write-back logic from backpressuring the pixel pipeline (block 830). After block 830, write-back may be aborted (block 850) and then method 800 may end. In one embodiment, when the display pipeline prevents the write-back logic from backpressuring the pixel pipeline for a given frame, the display pipeline may not attempt to compress and write-back the output frame to memory for the next frame after the given frame. However, in another embodiment, the display pipeline may attempt to compress and write-back the output frame to memory for one or more frames after the given frame (assuming the idle frame condition still exists). The number of frames for which the display pipeline will attempt to compress and write-back the output frame to memory may be programmable.

If the amount of pixel data is above the threshold (conditional block 825), then the display pipeline may allow the write-back logic to backpressure the pixel pipeline (block 835). The display pipeline may then determine if the entire compressed output frame has been written back to memory (conditional block 840). If the entire compressed output frame has been written back to memory (conditional block 840), then the display pipeline may read the compressed output frame for successive frames for as long as the idle frame condition exists (block 845). After block 845, method 800 may end. If the entire compressed output frame has not been written back to memory (conditional block 840), then method 800 may return to block 820 with the display pipeline continuing to monitor the amount of pixels in the pixel buffer(s). It is noted that method 800 may be performed each time the idle frame condition is detected.

Figure 9:
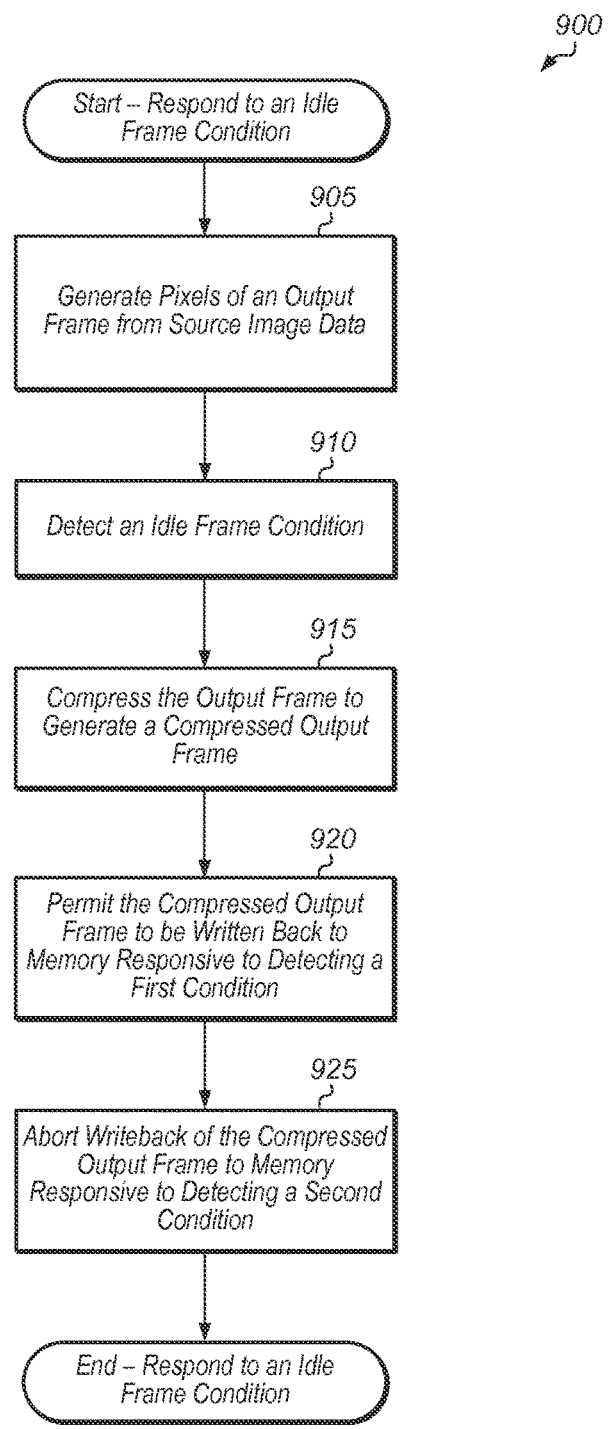
FIG. 9 is a generalized flow diagram illustrating another embodiment of a method for responding to an idle frame condition.

Referring now to FIG. 9, one embodiment of a method 900 for responding to an idle frame condition is shown. The components embodied in SoC 110 (of FIG. 1) described above (e.g., display pipe 116) and/or the components in display control unit 300 (of FIG. 3) may generally operate in accordance with method 900. In addition, the steps in this embodiment are shown in sequential order. However, some steps may occur in a different order than shown, some steps may be performed concurrently, some steps may be combined with other steps, and some steps may be absent in another embodiment. For example, some steps may be performed in parallel in combinatorial logic circuitry in the display control unit 300 (and components thereof). Blocks, combinations of blocks, and/or the flowchart as a whole may be pipelined over multiple clock cycles.

A display control unit may be configured to generate pixels of an output frame from source image data, wherein the output frame is to be displayed on a display device controlled by the display control unit (block 905). At a given point in time, an idle frame condition may be detected by the display control unit or by another unit of the host SoC (block 910).

In response to detecting the idle frame condition, the display control unit may be configured to compress the output frame to generate a compressed output frame (block 915). The display control unit may permit the compressed output frame to be written back to memory responsive to detecting a first condition (block 920). In one embodiment, the first condition may comprise detecting that the amount of pixel data in the pixel buffer is above a programmable threshold. In other embodiments, the second condition may comprise one or more other indications that an underrun of the display is unlikely to occur.

Next, the display control unit may abort writeback of the compressed output frame to memory responsive to detecting a second condition (block 925). In one embodiment, the second condition may comprise detecting that the number of pixels in the pixel buffer is below the programmable threshold. In another embodiment, the second condition may comprise detecting that a QoS level of memory requests has been elevated to a relatively high level. In other embodiments, the first condition may comprise one or more other indications that an underrun of the display is likely to occur. In one embodiment, the first condition and second condition may be mutually exclusive at any given moment in time. In another embodiment, the first and second conditions may not be mutually exclusive, and the second condition may take precedence over the first condition if both conditions are detected at the same time. After block 925, method 900 may end.

Figure 10:
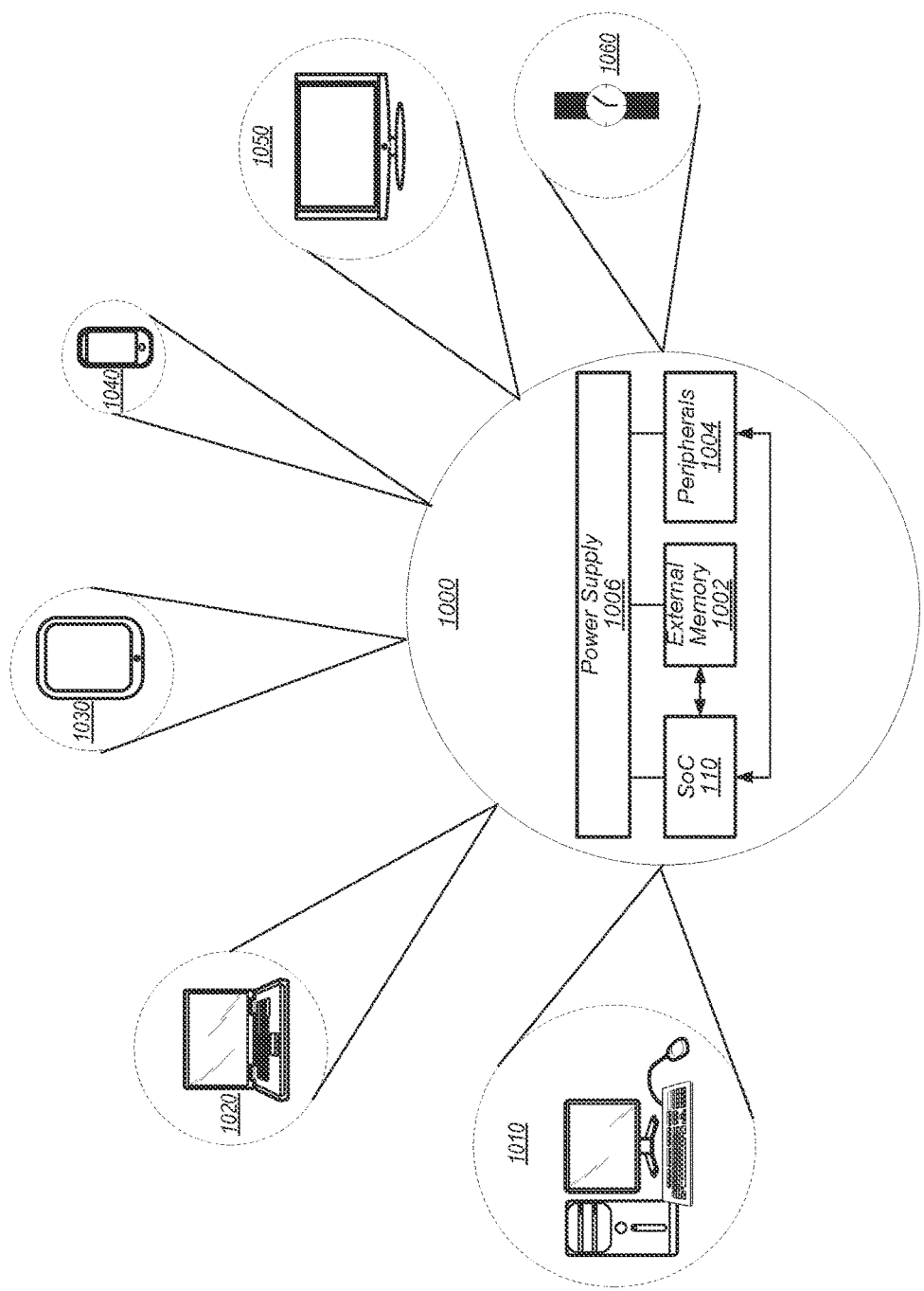
FIG. 10 is a block diagram of a system including the SOC shown in FIG. 1.

Turning next to FIG. 10, a block diagram of one embodiment of a system 1000 is shown. As shown, system 1000 may represent chip, circuitry, components, etc., of a desktop computer 1010, laptop computer 1020, tablet computer 1030, cell phone 1040, television 1050 (or set top box configured to be coupled to a television), wrist watch or other wearable item 1060, or otherwise. Other devices are possible and are contemplated. In the illustrated embodiment, the system 1000 includes at least one instance of SoC 110 (of FIG. 1) coupled to an external memory 1002.

SoC 110 is coupled to one or more peripherals 1004 and the external memory 1002. A power supply 1006 is also provided which supplies the supply voltages to SoC 110 as well as one or more supply voltages to the memory 1002 and/or the peripherals 1004. In various embodiments, power supply 1006 may represent a battery (e.g., a rechargeable battery in a smart phone, laptop or tablet computer). In some embodiments, more than one instance of SoC 110 may be included (and more than one external memory 1002 may be included as well).

The memory 1002 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 110 in a chip-on-chip configuration, a package-on-package configuration, or a multi-chip module configuration.

The peripherals 1004 may include any desired circuitry, depending on the type of system 1000. For example, in one embodiment, peripherals 1004 may include devices for various types of wireless communication, such as wifi, Bluetooth, cellular, global positioning system, etc. The peripherals 1004 may also include additional storage, including RAM storage, solid state storage, or disk storage. The peripherals 1004 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A display control unit comprising pixel generation circuitry configured to generate pixels of an output frame from source image data;
a pixel buffer configured to store pixels generated by the pixel generation circuitry;
a compression unit comprising circuitry configured to compress the output frame to generate a compressed output frame;
a control unit comprising circuitry configured to:
monitor an amount of pixels stored in the pixel buffer; and
convey a write-back indication that indicates whether write-back is allowed or prevented, based at least in part on the amount of pixels stored in the pixel buffer, wherein said write-back indication indicates write-back is allowed when the amount of pixels stored in the pixel buffer is above a threshold; and
a write back unit comprising circuitry configured to determine whether to write the compressed output frame to memory based at least in part on said write-back indication.

2. The display control unit as recited in claim 1, wherein said compression unit is configured to compress said output frame responsive to a detected idle frame condition.

3. The display control unit as recited in claim 2, wherein said pixel generation circuitry is configured to shut down while said idle frame condition exists.

4. The display control unit as recited in claim 1, wherein the display control unit is configured to compress the output frame and write the compressed output frame to the memory while simultaneously driving the output frame for display on a display device.

5. The display control unit as recited in claim 1, wherein the write back unit is further configured to convey a backpressure indication, responsive to determining one or more write buffers of the write-back unit are full, said backpressure indication being configured to reduce a rate of pixel generation by said pixel generation circuitry.

6. The display control unit as recited in claim 5, wherein the write back unit is configured to:
convey said backpressure indication to said pixel generation circuitry, in response to determining said write-back indication indicates write-back is allowed; and
prevent said backpressure indication from being conveyed to said pixel generation circuitry, in response to determining said write-back indication indicates write-back is prevented.

7. A method comprising:
generating pixels of an output frame from source image data;
storing said pixels in a pixel buffer;
compressing the output frame to generate a compressed output frame;
monitoring an amount of pixels stored in the pixel buffer;
conveying a write-back indication that indicates whether write-back is allowed or prevented, based at least in part on the amount of pixels stored in the pixel buffer, wherein said write-back indication indicates write-back is allowed when the amount of pixels stored in the pixel buffer is above a threshold; and
determining whether to write the compressed output frame to memory based at least in part on said write-back indication.

8. The method as recited in claim 7, wherein compressing said output frame is responsive to a detected idle frame condition.

9. The method as recited in claim 8, further comprising preventing generating said pixels while said idle frame condition exists.

10. The method as recited in claim 7, further comprising compressing the output frame and writing the compressed output frame back to the memory while simultaneously driving the output frame to a display device.

11. The method as recited in claim 7, further comprising conveying a backpressure indication responsive to determining one or more write buffers of a write-back unit are full, said backpressure indication being configured to reduce a rate of generating said pixels.

12. The method as recited in claim 11, further comprising:
conveying said backpressure indication, in response to determining said write-back indication indicates write-back is allowed; and
preventing said backpressure indication from being conveyed, in response to determining said write-back indication indicates write-back is prevented.

13. A system comprising:
a display control unit comprising circuitry;
a memory;
pixel generation circuitry configured to generate pixels of an output frame from source image data;
a pixel buffer configured to store pixels generated by the pixel generation circuitry;
a compression unit configured to compress the output frame to generate a compressed output frame;
a control unit comprising circuitry configured to:
monitor an amount of pixels stored in the pixel buffer; and
convey a write-back indication that indicates whether write-back is allowed or prevented, based at least in part on the amount of pixels stored in the pixel buffer, wherein said write-back indication indicates write-back is allowed when the amount of pixels stored in the pixel buffer is above a threshold; and
a write back unit configured to determine whether to write the compressed output frame to said memory based at least in part on said write-back indication.

14. The system as recited in claim 13, wherein said compression unit is configured to compress said output frame responsive to a detected idle frame condition.

15. The system as recited in claim 14, wherein said pixel generation circuitry is configured to shut down while said idle frame condition exists.

16. The system as recited in claim 13, wherein the display control unit is configured to compress the output frame and write the compressed output frame to the memory while simultaneously driving the output frame to a display device.

17. The system as recited in claim 13, wherein said write back unit is further configured to convey a backpressure indication based at least in part on said write-back indication, responsive to determining one or more write buffers of the write-back unit are full, said backpressure indication being configured to reduce a rate of pixel generation by said pixel generation circuitry.

* * * * *